Aug. 11, 1925.
G. F. BULL
1,548,865
WEED REMOVING DEVICE
Filed Sept. 29, 1923    3 Sheets-Sheet 3
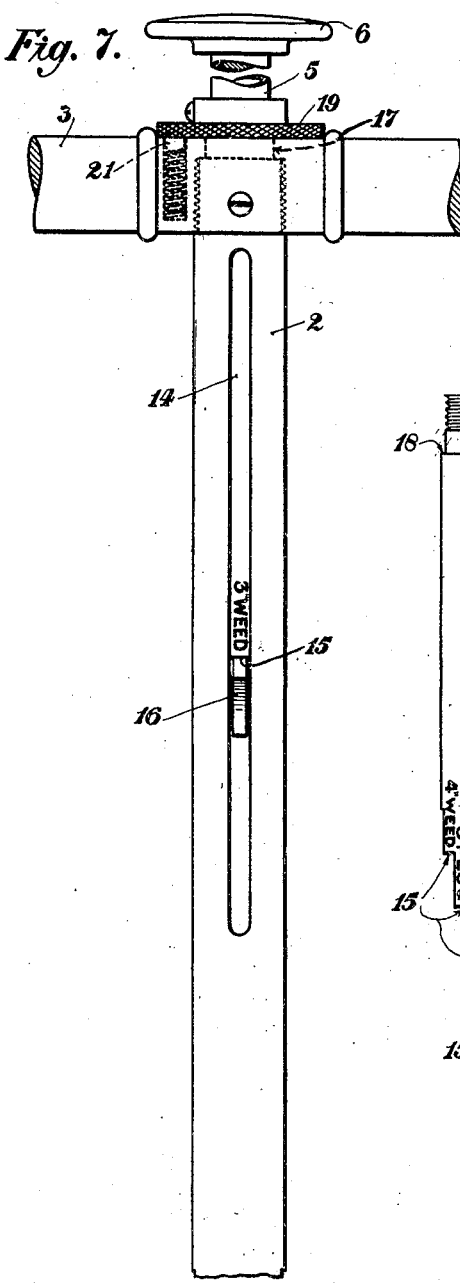
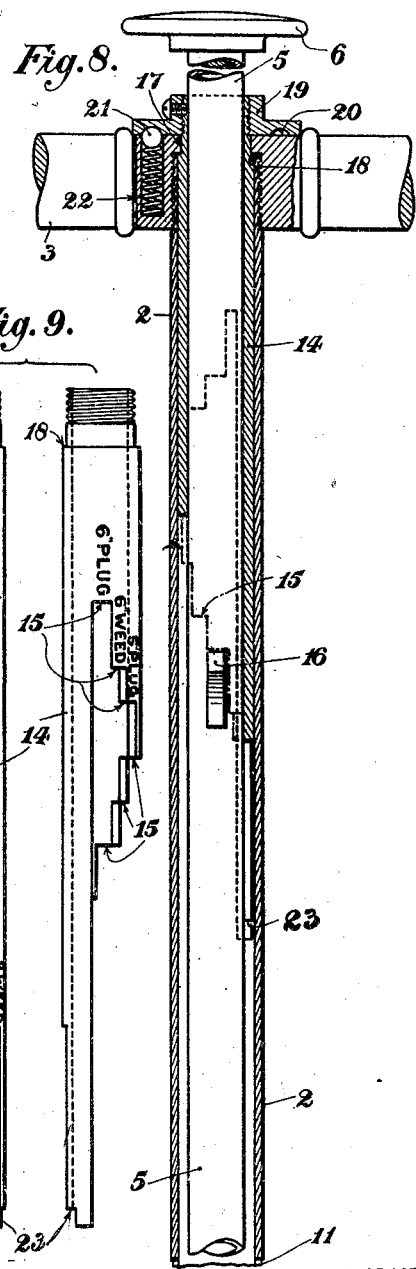
INVENTOR:
George Frederick Bull
By Richards & Geier
Attys.

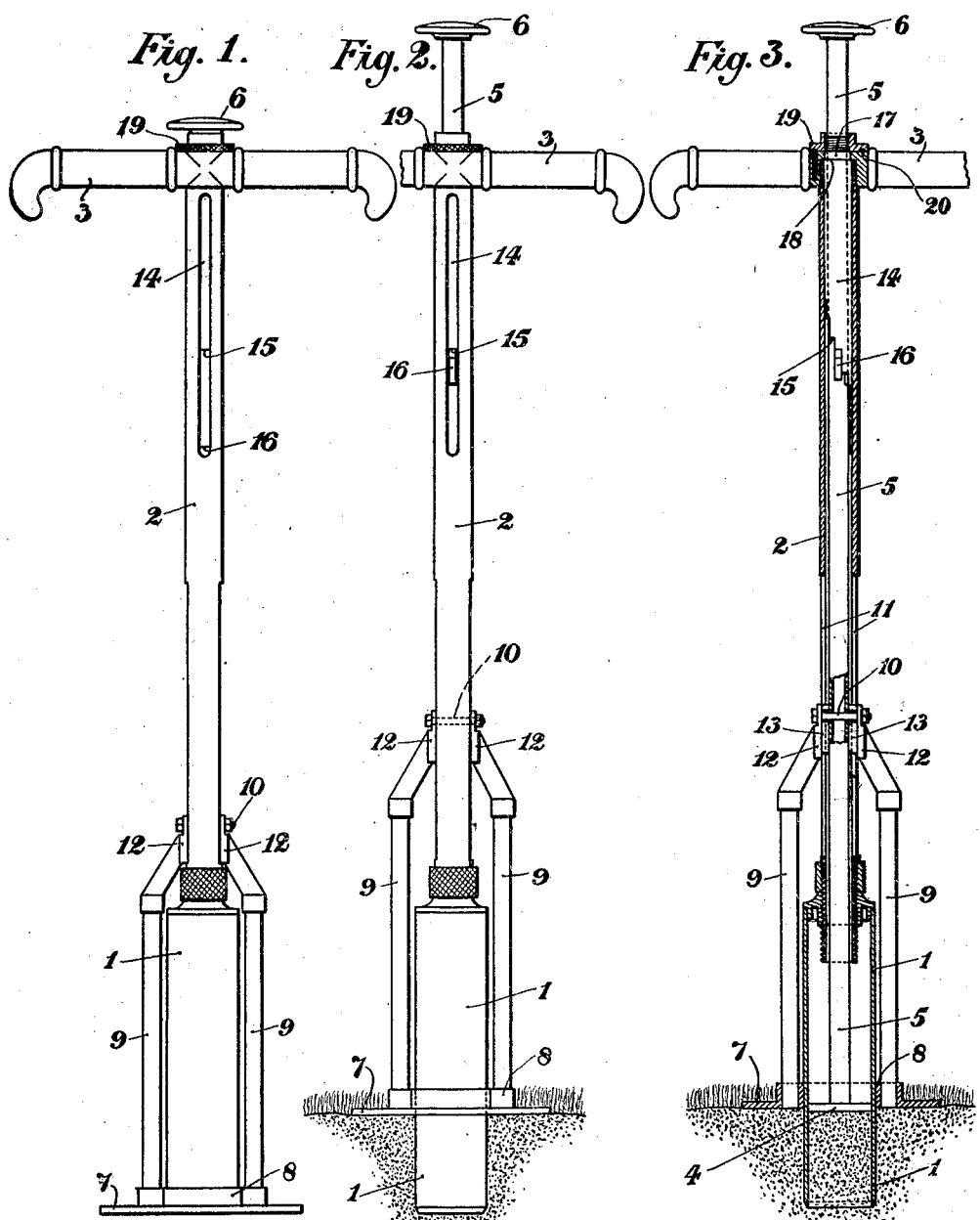

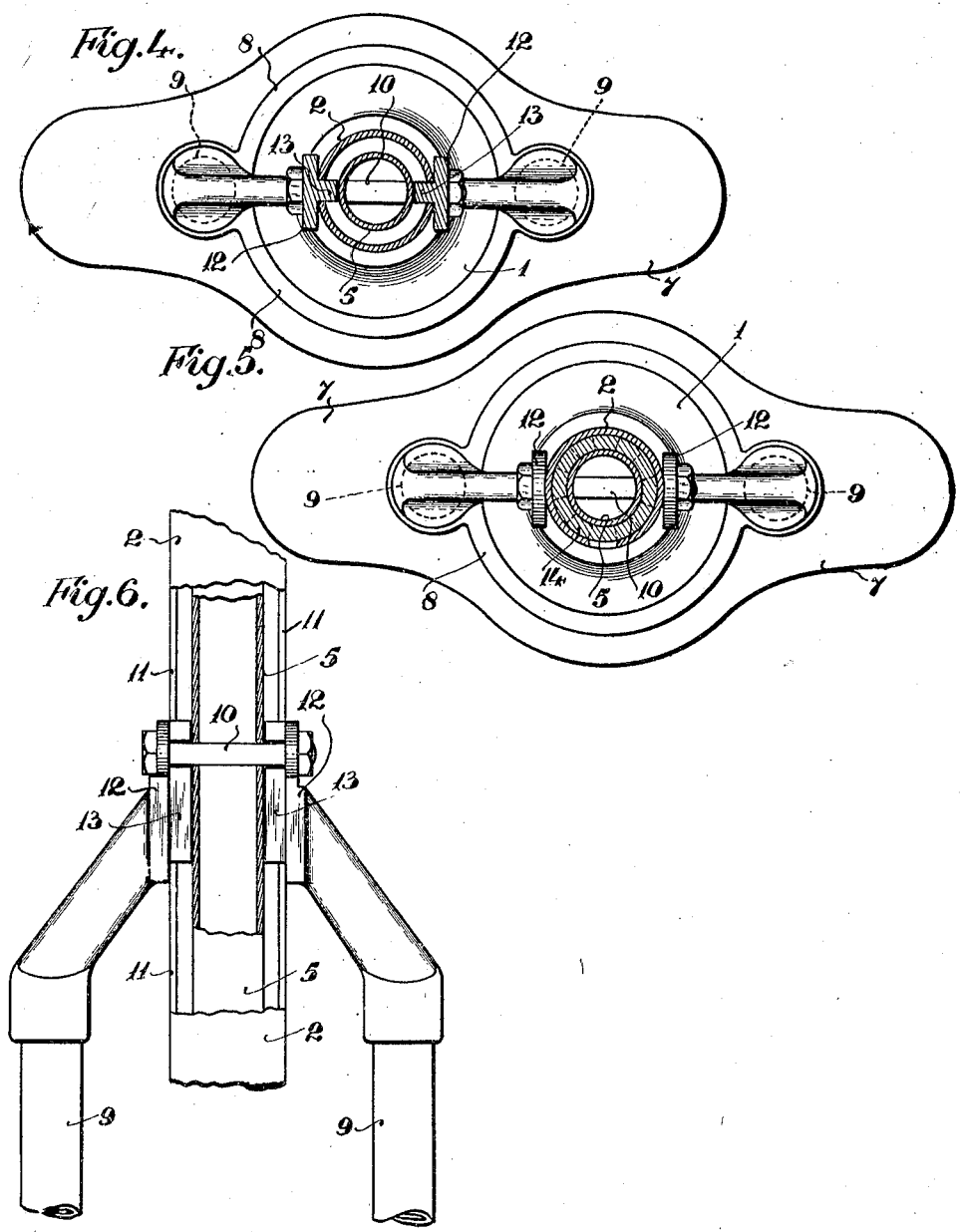

Patented Aug. 11, 1925.

1,548,865

UNITED STATES PATENT OFFICE.

GEORGE FREDERICK BULL, OF BIRMINGHAM, ENGLAND, ASSIGNOR OF ONE-HALF TO CHARLES H. PUGH LIMITED, OF WHITWORTH WORKS, BIRMINGHAM, ENGLAND.

WEED-REMOVING DEVICE.

Application filed September 29, 1923. Serial No. 665,541.

*To all whom it may concern:*

Be it known that I, GEORGE FREDERICK BULL, a subject of the King of Great Britain, residing at Whitworth Works, Tilton Road, Small Heath, Birmingham, England, have invented certain new and useful Improvements in Weed-Removing Devices, of which the following is a specification.

This invention relates to devices for removing weeds or turf from lawns or the like, but has more particular reference to weed or turf removing devices of that type comprising a tubular or cylindrical cutter adapted to be pushed into the ground so as to cut out the weed or turf, the weed or turf being contained within the cutter and being removed with the latter when the same is withdrawn from the ground, when it is expelled from the cutter by an ejector.

The object of the present invention is to provide an improved construction of device of this type, and the invention consists essentially in providing same with an external base member or foot-plate adapted to steady the device whilst the cutter is being pushed into the ground, the said base member being preferably connected to the ejector, in order that, after the cutter has been removed from the ground the ejector may be held stationary by placing the foot on the base member so that by moving the cutter upwards at the same time the plug of turf may readily be expelled from the latter. Means are also preferably provided for limiting or for varying the depth of cut, and for this purpose a series of stops or shoulders may be provided upon a sleeve member adapted to be rotated to bring one or other of the stops or shoulders into a position to co-operate with a stop on the ejector-shaft, to admit of the depth of cut being varied as desired.

Figure 1 of the accompanying drawings represents an elevational view of the improved weed or turf remover, showing the cutter in its normal position before being forced downwards.

Figure 2 is an elevational view showing the cutter forced downwards into the turf, and illustrating the manner in which the base member rests upon the ground.

Figure 3 is a vertical section through the device, after the cutter has been forced into the ground, showing the stepped sleeve member for adjusting the depth of cut.

Figures 4 and 5 are enlarged transverse sections of Figure 3 taken in different planes.

Figure 6 is a vertical section upon a larger scale illustrating more clearly the manner in which the upper ends of the stirrup member which carries the base-plate are connected to the rod of the ejector or plunger.

Figure 7 is an elevational view of the upper portion of the device upon a larger scale.

Figure 8 illustrates a vertical section through the upper portion of the device upon a larger scale.

Figure 9 illustrates separate views of the stepped sleeve member for adjusting the depth of cut.

The same reference numerals indicate corresponding parts in each of the figures.

Referring to the drawings, the improved weed or turf remover comprises a cylindrical cutter 1 carried by the lower end of an axially-disposed tubular shaft 2, open at both ends, the lower end of the cutter 1 being formed with a cutting edge. A transverse handle 3 is screwed on to the upper end of the cutter-shaft for enabling the cutter to be forced into the turf. Fitted within the cutter 1 is a circular disc 4 of a diameter slightly less than that of the cutter, this disc forming the ejector or plunger for removing the turf from the cutter, and being carried by a rod 5 passing axially through the cutter-shaft 2 so as to extend beyond its upper end, the extremity of the said rod 5 being fitted with a suitable actuating knob 6. After the cutter 1 has been forced into the ground over the weed or turf to be removed, in the manner shown in Figures 2 and 3, it is withdrawn bringing away the turf or weed, which is contained within the cutter at the same time. By forcing the cutter into the ground the ejector or plunger 4 is moved in a direction towards the upper end of the said cutter, and after the withdrawal of the latter the turf or weed contained within the cutter may be readily removed by drawing the latter upwards by the handle 3 whilst the ejector 4 is held stationary. For this purpose a base-plate 7 is provided having a central hole, preferably surrounded by a vertical flange or collar 8, within which the cutter 1 is free to slide. This base member is formed with lateral extensions upon which the feet of the user may be placed, and is carried by a stirrup member comprising a pair of vertical rods 9 arranged to come upon opposite sides of the cutter 1, the upper ends of the rods 9 having inwardly projecting extensions connected to the central ejector rod 5 by a transverse pin or bolt 10 arranged to work within oppositely-disposed slots 11 in the sides of the lower portion of the cutter-shaft 2. The extremities of the said inwardly-extending portions of the stirrup-rods are preferably provided with integral bearing lugs 12 engaging the outer wall of the cutter-shaft, and which are provided with longitudinal ribs or guides 13 adapted to engage and to work within the slots 11 in the latter. The base-member thus works in unison with the ejector or plunger 4. Thus, to remove the turf or weed from the cutter 1 the foot of the operator may be placed on one of the lateral extensions of the base-plate 7 so as to hold the ejector 4 stationary, whilst the cutter 1 is at the same time drawn upwards by the handle 3, causing the plug of turf, containing the weed, to be expelled. This base-plate 7 normally lies level with the lower edge of the cutter 1, as shown in Figure 1, and also serves, by placing the feet thereon, to steady the device whilst the cutter is being forced into the ground, so that a vertical cut may be readily obtained. In order to limit and to vary the depth of cut a sleeve 14 is fitted between the upper portion of the cutter-shaft 2 and the central rod 5 of the ejector. This sleeve is capable of being rotated but is prevented from moving relatively to the cutter shaft 2 in the longitudinal or axial direction. The greater portion of the sleeve 14 is cut away to form a series of stepped shoulders 15, which are separated in the axial or longitudinal direction of the said sleeve, and any one of these shoulders 15, which constitute stops, is adapted to be brought into a position to co-operate with a fixed stop or projection 16 upon the central ejector-rod 5 by rotating the sleeve 14 to bring the shoulder opposite the said stop. The transverse operating handle 3 is formed with a central screw-threaded hole engaging the screwed upper end of the cutter-shaft 2, and the said hole is provided around its upper edge with an inwardly-extending flange 17 against which an annular shoulder 18 formed around the upper portion of the sleeve 14, which is left uncut, is arranged to abut, the sleeve being thereby prevented from moving out of the cutter-shaft. The extremity of the said upper portion of the sleeve 14 is screw-threaded and extends through the transverse handle and is fitted with a flanged head 19 whereby it may be readily turned, the ejector rod 5 passing centrally through the latter. Formed upon the underside of this flanged head 19 are a number of recesses 20 (see Figure 8) corresponding to the number of shoulders or stops on the sleeve, whilst a spring-influenced ball 21 is housed within a recess 22 in the upper face of the central portion of the handle, and is adapted, on the sleeve 14 being turned to bring any particular shoulder or stop 15 opposite the stop 16 on the ejector-rod, to snap into one or other of these recesses 20 and so retain the sleeve in the desired position. By turning the sleeve 14 to bring different shouldered portions or stops 15 opposite the fixed stop 16 on the ejector-rod 5 the extent to which the ejector or plunger 4 may move up within the cutter 1 may be varied, thus varying the depth of cut. A shoulder or stop 23 may be provided at the lower end of the sleeve 14 for locking the ejector or plunger 4 in a position to close the lower end of the cutter 1, if desired.

After the turf containing the weed has been removed it is desirable to fill up the hole so made by fresh turf. As this turf is usually of a softer nature than the turf which has been removed it is desirable that the ejector or plunger 4 be adjusted to give the cutter 1 a slightly greater depth of cut when it has been forced into the fresh turf, so that after the latter has been transferred into the hole to be filled by inserting the cutter into the hole and then drawing it upwards whilst the base plate and ejector are held stationary, the said turf when pressed down comes substantially level with the uncut portion of the lawn or the like. For this purpose alternate shoulders or stops 15 on the sleeve are preferably arranged to give this slight extra depth of cut for use when the device is employed for cutting the fresh turf. The shoulders may consequently be marked alternately with the words "Weed" and "Plug," so that the device may be readily adjusted as required.

The base member may be of any desired shape or form and may be attached to the central ejector-rod in any desired manner.

Instead of the sleeve being formed with a series of stepped shoulders or stops as above described, it may be formed with a pair of shoulders only, one for giving the depth of cut for the turf to be removed, and the other to give the depth of cut for the fresh turf to be replaced within the hole; or, if desired, a single stop or shoulder only may be provided upon the sleeve.

Any suitable form of catch may be provided upon the one part, either upon the sleeve or the head or other member carried thereby or upon the cutter-shaft or part carried thereby, adapted to engage with one or other of a number of recesses in the other part, so that the sleeve may be retained in a position with any particular stop or shoulder thereon opposite the stop on the ejector-rod.

Having fully described my invention, what I desire to claim and secure by Letters Patent is:—

1. A device for removing weeds and turf from lawns and the like, comprising a tubular cutter, a hollow shaft carrying the cutter and having slots therein, an ejector disposed within the cutter, a rod carrying the ejector and arranged within the cutter-shaft, a base member connected to the ejector-rod, a bolt extending through said slots and connecting said base member and rod, a member disposed between the ejector-rod and the cutter-shaft, and a stop upon the said member adapted to co-operate with a stop on the ejector-rod to limit the depth of cut.

2. A device for removing weeds and turf from lawns and the like comprising a tubular cutter, a hollow shaft carrying the cutter and having slots therein, an ejector disposed within the cutter, a rod carrying the ejector and disposed within the cutter-shaft, a base member connected to the ejector-rod, a bolt extending through said slots and connecting said base member and rod, a rotatable sleeve disposed between the ejector-rod and the cutter shaft, and stops on the sleeve any one of which may be brought by turning the sleeve opposite a stop on the ejector-rod to vary the depth of cut.

3. A device for removing weeds and turf from lawns and the like comprising a base member, a tubular cutter, a hollow shaft carrying the cutter, an ejector disposed within the cutter and connected to the base member, a rod carrying the ejector and disposed within the cutter-shaft, a rotatable sleeve disposed between the ejector-rod and the cutter-shaft, stops on the sleeve, a stop on the ejector-rod, and a spring catch adapted to retain the sleeve in a position with any one of the stops thereon opposite the stop on the ejector-rod.

4. A device for removing weeds and turf from lawns and the like, comprising a tubular cutter, a hollow shaft carrying the cutter, an ejector disposed within the cutter, a central rod carrying the ejector and disposed within the cutter-shaft, a transverse handle upon the cutter-shaft, a rotatable sleeve disposed between the ejector-rod and the cutter-shaft, shouldered portions on the sleeve, a stop on the ejector-rod, a flanged head at the upper end of the sleeve to permit of the rotation of the latter, and a ball catch between the flanged head and the end of the cutter-shaft adapted to retain the sleeve in a position with any one of the shoulders opposite the stop on the ejector-rod.

In testimony whereof I have hereunto set my hand.

GEORGE FREDERICK BULL.